(12) United States Patent
Cheng et al.

(10) Patent No.: US 11,231,768 B1
(45) Date of Patent: Jan. 25, 2022

(54) METHOD OF CONTROLLING STYLUS AND FINGER TOUCH DETECTION AND RELATED CONTROLLER

(71) Applicant: NOVATEK Microelectronics Corp., Hsin-Chu (TW)

(72) Inventors: Yen-Cheng Cheng, Hsinchu (TW); Hsiu-Hui Yang, Hsinchu (TW); Wei-Kang Tsai, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/008,578

(22) Filed: Aug. 31, 2020

(51) Int. Cl.
*G06F 3/041* (2006.01)
*G06F 1/3234* (2019.01)
*G06F 3/0354* (2013.01)

(52) U.S. Cl.
CPC ........ *G06F 1/3262* (2013.01); *G06F 3/03545* (2013.01); *G06F 3/04184* (2019.05); *G06F 2203/04104* (2013.01)

(58) Field of Classification Search
CPC .............. G06F 1/3262; G06F 3/04184; G06F 3/03545; G06F 2203/04104; G06F 3/041
See application file for complete search history.

(56) References Cited

U.S. PATENT DOCUMENTS

| | | | | |
|---|---|---|---|---|
| 9,785,272 | B1 * | 10/2017 | Rosenberg | ............ G06F 1/3262 |
| 2009/0256817 | A1 * | 10/2009 | Perlin | .................... G06F 3/0237 345/174 |
| 2015/0138101 | A1 * | 5/2015 | Park | .................... G06F 3/04883 345/173 |
| 2017/0046007 | A1 * | 2/2017 | Kitagawa | .............. G06F 3/0445 |
| 2018/0113559 | A1 * | 4/2018 | Bae | ........................ G06F 3/0442 |

* cited by examiner

*Primary Examiner* — Lunyi Lao
*Assistant Examiner* — Jarurat Suteerawongsa
(74) *Attorney, Agent, or Firm* — Winston Hsu

(57) ABSTRACT

The present invention provides a method of a controller, for controlling a plurality of drivers, each coupled to a panel having a plurality of areas and configured to control at least one of the areas of the panel. The method includes steps of: controlling each of the drivers to perform finger touch detection in a first finger detection mode and perform stylus detection in a first stylus detection mode; when a finger touch is detected on a first area in the first finger detection mode, controlling a first driver corresponding to the first area to perform finger touch detection in a second finger detection mode on the first area; and when a stylus is detected on a second area in the first stylus detection mode, controlling a second driver corresponding to the second area to perform stylus detection in a second stylus detection mode on the second area.

20 Claims, 12 Drawing Sheets

FIG. 2

| | Display | Finger | Display | Stylus | Display | Finger | Display | Stylus |
|---|---|---|---|---|---|---|---|---|
| FR1 | | | | | | | | |

| | Display | Finger | Display | | Display | Finger | Display | |
|---|---|---|---|---|---|---|---|---|
| FR2 | | | | | | | | |
| FR3 | Display | Finger | Display | | Display | Finger | Display | |
| FR4 | Display | Finger | Display | | Display | Finger | Display | |

FIG. 6

FR1 | Display | Finger | Display | Stylus | Display | Finger | Display | Stylus
FR2 | Display | | Display | Stylus | Display | | Display | Stylus
FR3 | Display | | Display | Stylus | Display | | Display | Stylus
FR4 | Display | | Display | Stylus | Display | | Display | Stylus

METHOD OF CONTROLLING STYLUS AND FINGER TOUCH DETECTION AND RELATED CONTROLLER

BACKGROUND OF THE INVENTION

1. Field of the Invention

The present invention relates to a method of controlling stylus and finger touch detection, and more particularly, to a method of controlling stylus and finger touch detection on a large-scale touch panel.

2. Description of the Prior Art

In various electronic products such as mobile phones, GPS navigator systems, monitors, laptops and computers, a touch panel is widely utilized as the interface for data communication. The touch panel is a human-based input device, which complies with requirements for hierarchy menu, and possesses keyboard and mouse functions and human-based operations such as hand writing input as well. Particularly, the touch panel is capable of integrating input and output functions in the same interface, e.g. the screen. This feature is far superior to the conventional input devices.

With increasing dimension and resolution requirements of the touch panel, the touch panel may be controlled through multiple source driver integrated circuits (ICs), and each source driver IC is configured to control the display and touch functions on an area of the touch panel. The increasing dimension and resolution of the touch panel are usually accompanied by increasing power consumption. Therefore, how to reduce the power consumption of touch panel has become an important issue to be solved in this art.

SUMMARY OF THE INVENTION

It is therefore an objective of the present invention to provide a method of controlling stylus and finger touch detection and a related controller, which are capable of reducing the detection rate for stylus detection and/or finger touch detection, in order to reduce the power consumption.

An embodiment of the present invention discloses a method of a controller for controlling a plurality of drivers. Each of the plurality of drivers is coupled to a panel having a plurality of areas, and configured to control at least one of the plurality of areas of the panel. The method comprises steps of: controlling each of the plurality of drivers to perform finger touch detection in a first finger detection mode and perform stylus detection in a first stylus detection mode; when a finger touch is detected on a first area among the plurality of areas in the first finger detection mode, controlling a first driver corresponding to the first area to perform finger touch detection in a second finger detection mode on the first area; and when a stylus is detected on a second area among the plurality of areas in the first stylus detection mode, controlling a second driver corresponding to the second area to perform stylus detection in a second stylus detection mode on the second area.

Another embodiment of the present invention discloses a controller coupled to a plurality of drivers. Each of the plurality of drivers is coupled to a panel having a plurality of areas, and configured to control at least one of the plurality of areas of the panel. The controller is configured to: control each of the plurality of drivers to perform finger touch detection in a first finger detection mode and perform stylus detection in a first stylus detection mode; when a finger touch is detected on a first area among the plurality of areas in the first finger detection mode, control a first driver corresponding to the first area to perform finger touch detection in a second finger detection mode on the first area; and when a stylus is detected on a second area among the plurality of areas in the first stylus detection mode, control a second driver corresponding to the second area to perform stylus detection in a second stylus detection mode on the second area.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is an exemplary timing diagram of the operations of the touch panel.

FIG. 6 is a schematic diagram of a touch detection scheme according to an embodiment of the present invention.

FIGS. 8 and 9 are schematic diagrams of a touch detection scheme according to an embodiment of the present invention.

FIG. 11 is a schematic diagram of a touch detection scheme according to an embodiment of the present invention.

DETAILED DESCRIPTION

Figure 1:
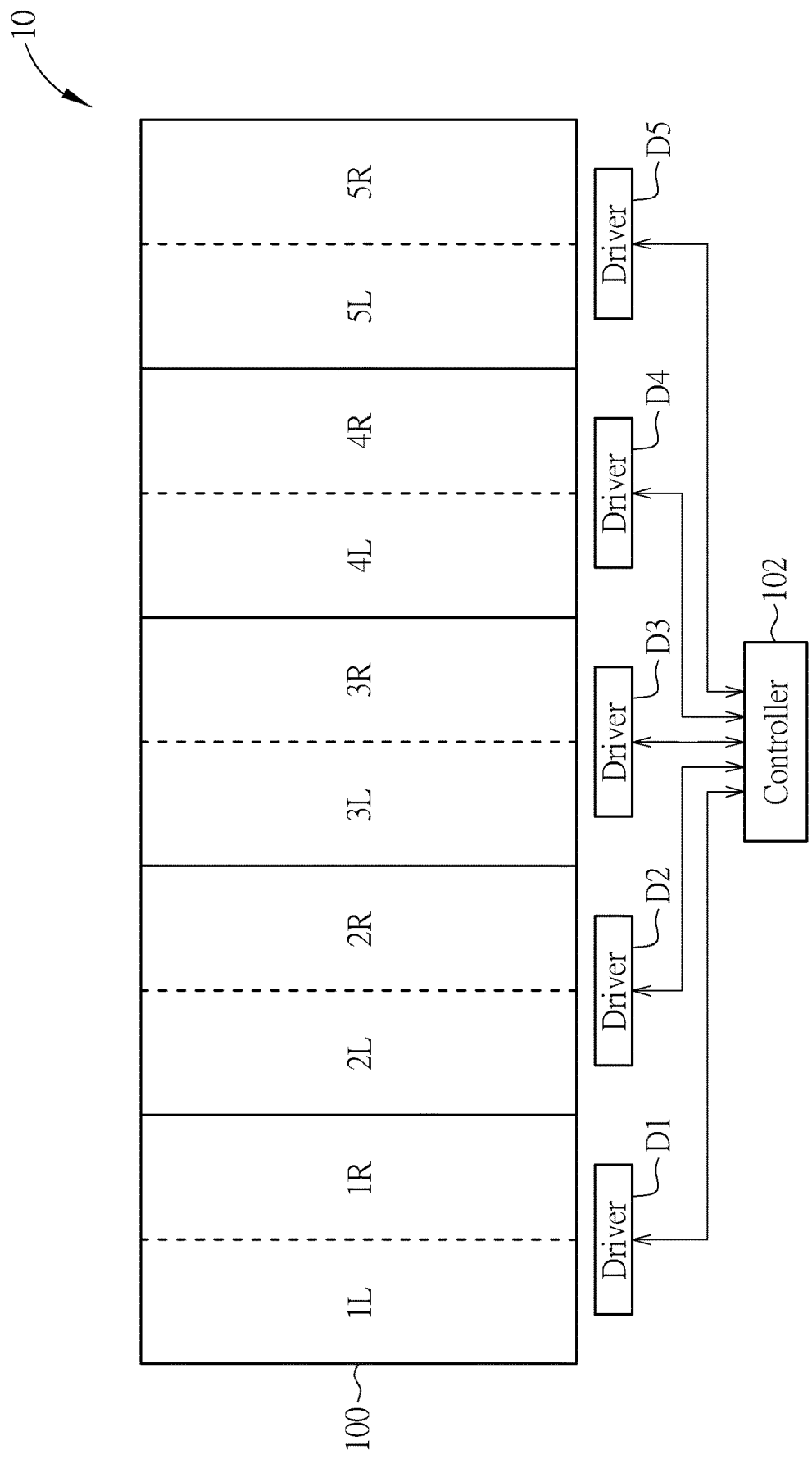
FIG. 1 is a schematic diagram of a driving system for a touch panel.

Please refer to FIG. 1, which is a schematic diagram of a driving system 10 for a touch panel 100. The driving system 10 includes a controller 102 and drivers D1-D5. The touch panel 100 may be a large-scale touch panel, which is controlled by multiple driver integrated circuits (ICs). In this embodiment, each of the five drivers D1-D5 may be implemented as a source driver IC including a touch with display driver integration (TDDI) circuit, to be served to control the touch panel 100. More specifically, the touch panel 100 may be separated into ten areas, each of which is controlled by the corresponding driver separately and independently. For example, the driver D1 is served to control the areas 1L and 1R, the driver D2 is served to control the areas 2L and 2R, the driver D3 is served to control the areas 3L and 3R, the driver D4 is served to control the areas 4L and 4R, and the driver D5 is served to control the areas 5L and 5R. Each driver D1-D5 may include multiple source output terminals for outputting display data to the corresponding areas of the touch panel 100, and multiple sensing terminals for receiving touch sensing signals from the corresponding areas of the touch panel 100.

The controller 102 may control and coordinate the operations of the drivers D1-D5, to facilitate the display operation and touch sensing operation. The controller 102 may be implemented as any feasible control device such as a microcontroller unit (MCU), a central processing unit (CPU), a microprocessor, or the like.

Figure 2:
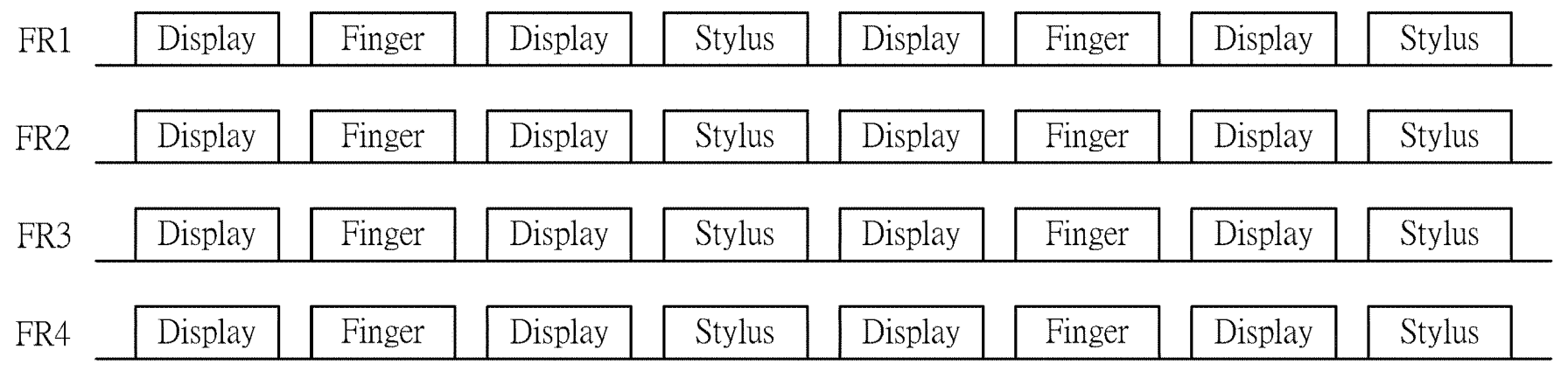

Please refer to FIG. 2, which is a timing diagram of the operations of the touch panel 100. As shown in FIG. 2, the operations include "Display", "Finger" and "Stylus" implemented in respective time slots of the image frame. More specifically, each frame time FR1-FR4 shown in FIG. 2 refers to the time required for displaying a frame of image, where the frame time is divided to multiple time slots, each allocated to one of the display operation, finger touch detection and stylus detection. For example, if the frame rate is 60 Hz, each frame time FR1-FR4 may equal 1/60 second. The display operation, finger touch detection and stylus detection are performed in the corresponding time slots of each frame time FR1-FR4. Note that the stylus detection herein aims at detecting an active stylus that may actively send signals to the touch sensors, which is different from the touch sensing scheme for a finger such as sensing capacitance variations caused by the touch finger. Therefore, the stylus detection and finger touch detection may be realized in different time slots.

As shown in FIG. 2, during the "Display" operation time, all drivers D1-D5 may output display data to the touch panel 100 to show desired images, during the "Finger" operation time, all drivers D1-D5 may receive touch sensing signals for finger from the touch panel 100, and during the "Stylus" operation time, all drivers D1-D5 may receive stylus sensing signals from the touch panel 100. The operation scheme in FIG. 2 requires that the finger touch detection and the stylus detection are performed in each allocated time slot of each frame, resulting in higher power consumption in the touch panel 100 and the driving system 10.

Figure 3:
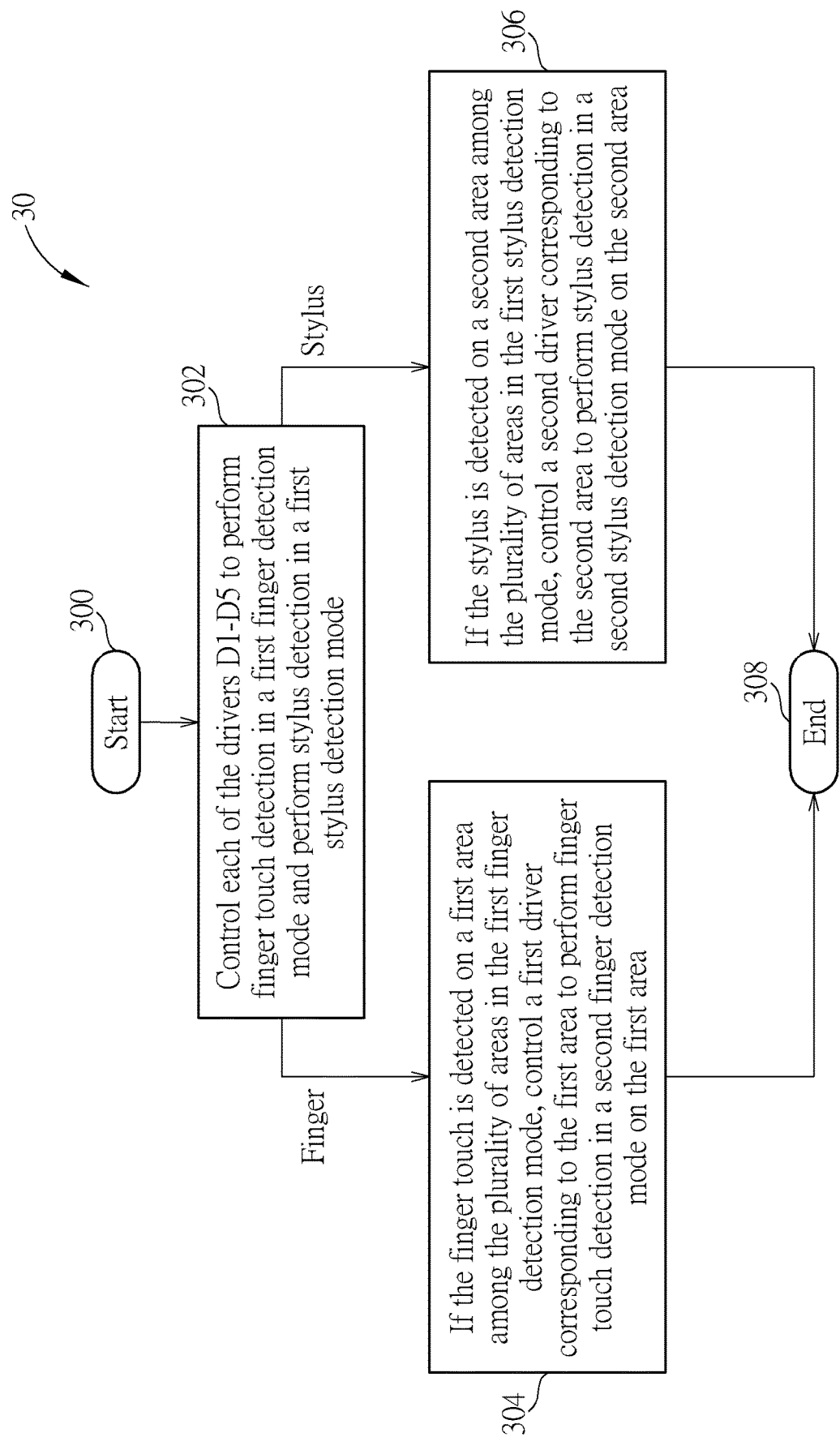
FIG. 3 is a flowchart of a process according to an embodiment of the present invention.

Please refer to FIG. 3, which is a flowchart of a process 30 according to an embodiment of the present invention. The process 30 may be implemented in a controller for a touch panel, such as the controller 102 shown in FIG. 1, for controlling the drivers (e.g., the drivers D1-D5) coupled to the touch panel (e.g., the touch panel 100), where the touch panel has a plurality of areas respectively controlled by the drivers. As shown in FIG. 3, the process 30 includes the following steps:

Step 300: Start.

Step 302: Control each of the drivers D1-D5 to perform finger touch detection in a first finger detection mode and perform stylus detection in a first stylus detection mode. When a finger touch is detected, go to Step 304; when a stylus is detected, go to Step 306.

Step 304: If the finger touch is detected on a first area among the plurality of areas in the first finger detection mode, control a first driver corresponding to the first area to perform finger touch detection in a second finger detection mode on the first area.

Step 306: If the stylus is detected on a second area among the plurality of areas in the first stylus detection mode, control a second driver corresponding to the second area to perform stylus detection in a second stylus detection mode on the second area.

Step 308: End.

Figure 4:
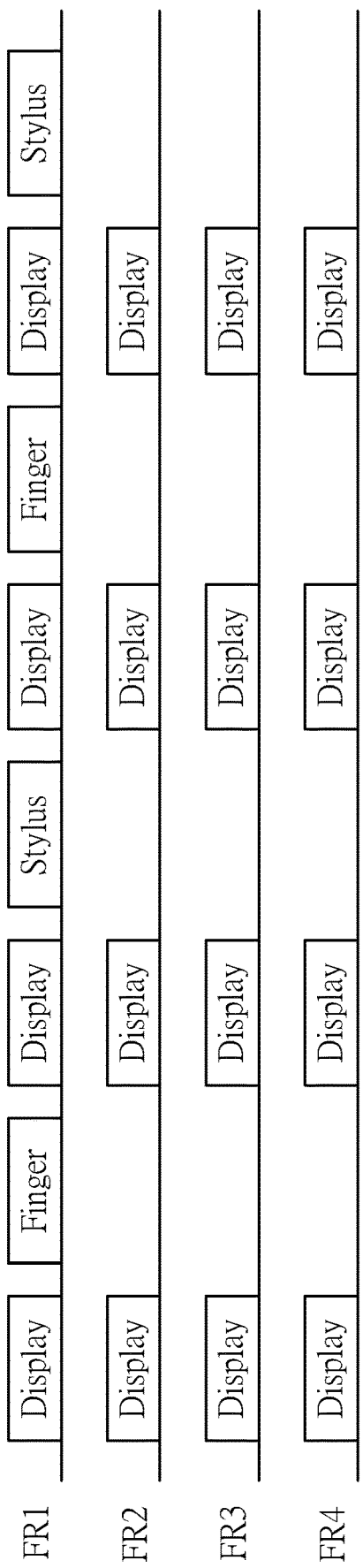
FIG. 4 is a schematic diagram of a touch detection scheme according to an embodiment of the present invention.

According to the process 30, the controller 102 first controls each of the drivers D1-D5 to perform finger touch detection in the first finger detection mode and perform stylus detection in the first stylus detection mode (Step 302). In the first finger detection mode and the first stylus detection mode, the drivers D1-D5 perform finger touch detection and stylus detection with a lower detection rate. FIG. 4 illustrates a lower detection rate of the first finger detection mode and the first stylus detection mode, where finger touch detection and stylus detection are performed in the frame time FR1 and omitted in the frame times FR2-FR4. In other words, among the allocated time slots of every 4 consecutive frame times, finger touch detection and stylus detection may be performed in the time slots of one frame time. If there is no finger touch or stylus detected, both the finger touch detection and stylus detection may stay in the first finger detection mode and the first stylus detection mode, i.e., operate with lower detection rate; hence, the power consumption of finger touch detection and stylus detection may be reduced.

The finger touch detection or stylus detection may be switched to a higher detection rate only if a touch object is detected and thus a higher touch report rate is required. When a finger touch is detected on the first area, the controller 102 may control the first driver corresponding to the first area to perform finger touch detection in the second finger detection mode on the first area (Step 304). In the second finger detection mode, the driver performs finger touch detection with a detection rate higher than the detection rate applied in the first finger detection mode. Meanwhile, the controller 102 may further control the drivers except for the first driver to stay in the first finger detection mode, to perform finger touch detection on the areas other than the first area with lower detection rate. If the first driver is configured to control more than one area of the touch panel 100, the controller 102 may further control the first driver to perform finger touch detection in the first finger detection mode (i.e., with lower detection rate) on the corresponding area(s) other than the first area. In addition, if there is no stylus detected on the touch panel 100 while the finger touch is detected on the first area, the drivers D1-D5 may stay in the first stylus detection mode, to perform stylus detection on all the areas of the touch panel 100 with lower detection rate. As a result, the power consumption of touch detection may be maintained in a satisfactory level.

Figure 5:
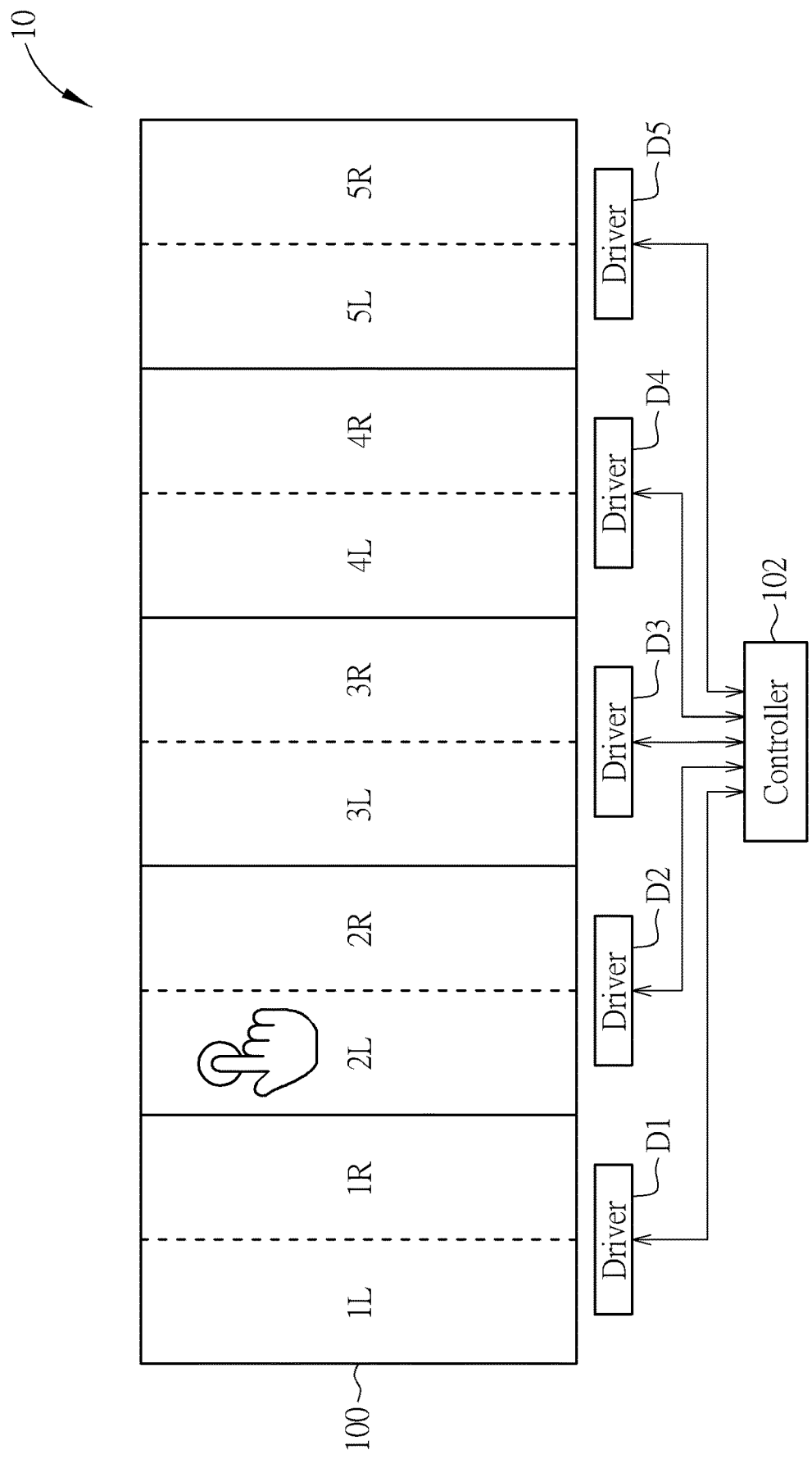
FIG. 5 illustrates that a finger touch is detected on the touch panel.

For example, in the touch panel 100, a finger touch may be detected on the area 2L while no stylus is detected, as shown in FIG. 5; hence, the area 2L may receive finger touch detection with higher detection rate and stylus detection with lower detection rate. FIG. 6 illustrates an exemplary touch detection scheme where the finger touch detection is performed with higher detection rate and the stylus detection is performed with lower detection rate. More specifically, among the frame times FR1-FR4, the finger touch detection is performed in all time slots allocated to "Finger" in the frame times FR1-FR4, and the stylus detection is performed in the allocated time slots of the frame time FR1 while omitted in other frame times FR2-FR4.

In an embodiment, the area 2L may apply the touch detection scheme as shown in FIG. 6, while other areas such as 1L, 1R, 2R, 3L, 3R, 4L, 4R, 5L and 5R may apply the touch detection scheme as shown in FIG. 4. In other words, as for those areas other than the area 2L, both the finger touch detection and the stylus detection may be performed with lower detection rate, in order to maintain the power consumption of touch detection in a satisfactory level. In this manner, both the finger touch detection and the stylus detection are performed in the corresponding time slots of the frame time FR1 only, while omitted in other frame times FR2-FR4.

Please note that the display timing will not change in the embodiments of the present invention. During the time slots originally allocated to the touch detection (finger touch or stylus detection) but omitted, the related touch control circuits may be turned off or disabled. That is, no touch detection is performed in the time slots, while the display operations are still performed in those time slots allocated to "Display". In other words, the display operations may not be performed in the omitted "Finger" or "Stylus" time slots, so as to prevent abnormal display image.

In another embodiment, considering that the touch finger may quickly move to an adjacent area on the touch panel 100, when the finger touch is detected on the first area (such as the area 2L), the controller 102 may control the corresponding driver (including the first driver (e.g., D2) for the first area and/or other adjacent driver(s) (e.g., D1 and/or D3)) to apply the second finger detection mode to the areas adjacent to the first area. Therefore, in addition to the first area, one or more adjacent areas may receive finger touch detection with higher detection rate. For example, as shown in FIG. 5, when a finger touch is detected on the area 2L, the areas 1R, 2L and 2R may receive finger touch detection with higher detection rate, as the touch detection scheme shown in FIG. 6. Meanwhile, other areas 1L, 3L, 3R, 4L, 4R, 5L and 5R may receive finger touch detection with lower detection rate, as the touch detection scheme shown in FIG. 4. Alternatively, the controller 102 may control the drivers D1-D5 and the touch panel 100 so that the areas 1L, 1R, 2L and 2R controlled by the drivers D1 and D2 may apply the touch detection scheme with higher finger detection rate as shown in FIG. 6, while the areas 3L, 3R, 4L, 4R, 5L and 5R controlled by the drivers D3-D5 may apply the touch detection scheme with lower finger detection rate as shown in FIG. 4. According to the embodiments of the present invention, the controller 102 may independently control each area of the touch panel 100 to receive finger touch detection with higher detection rate or lower detection rate according to the finger touch behavior, in order to achieve the optimal balance between power consumption and touch sensitivity.

In an embodiment, when a stylus is detected on the second area, the controller 102 may control the second driver corresponding to the second area to perform stylus detection in the second stylus detection mode on the second area (Step 306). In the second stylus detection mode, the driver performs stylus detection with a detection rate higher than the detection rate applied in the first stylus detection mode. Meanwhile, the controller 102 may further control the drivers except for the second driver to stay in the first stylus detection mode, to perform stylus detection on the areas other than the second area with lower detection rate. If the second driver is configured to control more than one area of the touch panel 100, the controller 102 may further control the second driver to perform stylus detection in the first stylus detection mode (i.e., with lower detection rate) on the corresponding area(s) other than the second area. In addition, if there is no finger touch detected on the touch panel 100 while the stylus is detected on the second area, the drivers D1-D5 may stay in the first finger detection mode, to perform finger touch detection on all the areas of the touch panel 100 with lower detection rate. As a result, the power consumption of touch detection may be maintained in a satisfactory level.

Figure 7:
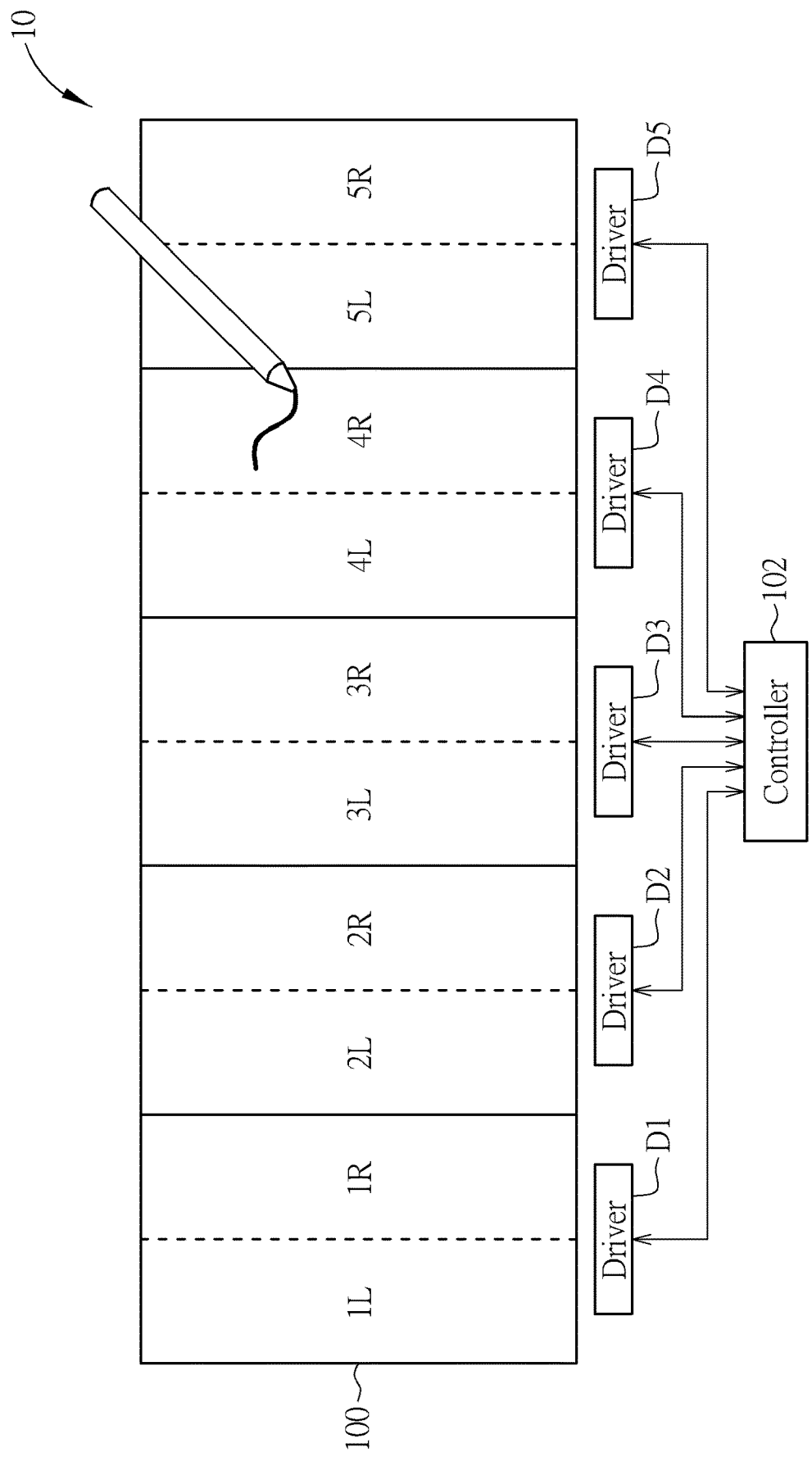
FIG. 7 illustrates that a stylus is detected on the touch panel.

For example, in the touch panel 100, a stylus may be detected on the area 4R while no finger touch is detected, as shown in FIG. 7; hence, the area 4R may receive stylus detection with higher detection rate and finger touch detection with lower detection rate. FIG. 8 illustrates an exemplary touch detection scheme where the stylus detection is performed with higher detection rate and the finger touch detection is performed with lower detection rate. More specifically, among the frame times FR1-FR4, the stylus detection is performed in all time slots allocated to "Stylus" in the frame times FR1-FR4, and the finger touch detection is performed in the allocated time slots of the frame time FR1 while omitted in other frame times FR2-FR4.

In an embodiment, the area 4R may apply the touch detection scheme as shown in FIG. 8, while other areas such as 1L, 1R, 2L, 2R, 3L, 3R, 4L, 5L and 5R may apply the touch detection scheme as shown in FIG. 4. In other words, as for those areas other than the area 4R, both the finger touch detection and the stylus detection may be performed with lower detection rate, in order to maintain the power consumption of touch detection in a satisfactory level. In this manner, both the finger touch detection and the stylus detection are performed in the corresponding time slots of the frame time FR1 only, while omitted in other frame times FR2-FR4.

In another embodiment, considering that the touch stylus may quickly move to an adjacent area on the touch panel 100, when the stylus is detected on the second area (such as the area 4R), the controller 102 may control the corresponding driver (including the second driver (e.g., D4) for the second area and/or other adjacent driver(s) (e.g., D3 and/or D5)) to apply the second stylus detection mode to the areas adjacent to the second area. Therefore, in addition to the second area, one or more adjacent areas may receive stylus touch detection with higher detection rate. For example, as shown in FIG. 7, when a stylus is detected on the area 4R, the areas 4L, 4R and 5L may receive stylus detection with higher detection rate, as the touch detection scheme shown in FIG. 8. Meanwhile, other areas 1L, 1R, 2L, 2R, 3L, 3R and 5R may receive stylus detection with lower detection rate, as the touch detection scheme shown in FIG. 4. Alternatively, the controller 102 may control the drivers D1-D5 and the touch panel 100 so that the areas 4L, 4R, 5L and 5R controlled by the drivers D4 and D5 may apply the touch detection scheme with higher stylus detection rate as shown in FIG. 8, while the areas 1L, 1R, 2L, 2R, 3L and 3R controlled by the drivers D1-D3 may apply the touch detection with lower stylus detection rate scheme as shown in FIG. 4.

Figure 9:
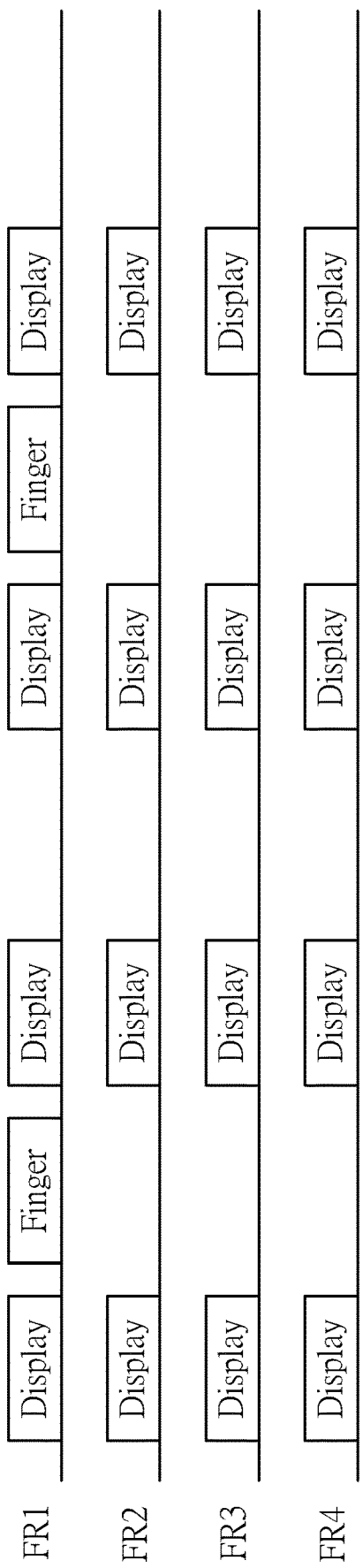

In an embodiment, the touch panel 100 and its related driving system 10 may be equipped with or support only one stylus. In such a situation, if the stylus is detected on a specific area, there will not be any other stylus appearing on another area. Therefore, the stylus detection on areas farther from the specific area may be omitted. In other words, the areas except for the specific area and its adjacent area(s) may be configured to receive no stylus detection from any of the drivers D1-D5. For example, as shown in FIG. 9, the stylus detection may be omitted in all time slots of the frame times FR1-FR4. FIG. 9 also shows that the finger touch detection is performed in the allocated time slots of the frame time FR1 while omitted in other frame times FR2-FR4, i.e., the lower detection rate.

Therefore, in the touch panel 100, if the stylus is detected on the area 4R while no finger touch is detected, as shown in FIG. 7, the areas 4L, 4R and 5L may apply the touch detection scheme with higher stylus detection rate as shown in FIG. 8, while other areas may apply the touch detection scheme without stylus detection as shown in FIG. 9. In other words, as for those areas farther from the area 4R, the stylus detection may be suspended. Alternatively, the areas 4L, 4R, 5L and 5R controlled by the drivers D4 and D5 may apply the touch detection scheme with higher stylus detection rate as shown in FIG. 8, while the areas 1L, 1R, 2L, 2R, 3L and 3R controlled by the drivers D1-D3 may apply the touch detection scheme without stylus detection as shown in FIG. 9. Alternatively, the area 4R may apply the touch detection scheme with higher stylus detection rate as shown in FIG. 8, the adjacent areas 4L and 5L may apply the touch detection scheme with lower stylus detection rate as shown in FIG. 4, and other areas may apply the touch detection scheme without stylus detection as shown in FIG. 9. And alternatively, the areas 4L, 4R and 5L may apply the touch detection scheme with higher stylus detection rate as shown in FIG. 8, the areas 3R and 5R may apply the touch detection scheme with lower stylus detection rate as shown in FIG. 4, and other areas may apply the touch detection scheme without stylus detection as shown in FIG. 9. According to the embodiments of the present invention, the controller 102 may independently control each area of the touch panel 100 to receive stylus detection with higher detection rate or lower detection rate or perform no stylus detection according to the stylus behavior, in order to achieve the optimal balance between power consumption and touch sensitivity.

Figure 10:
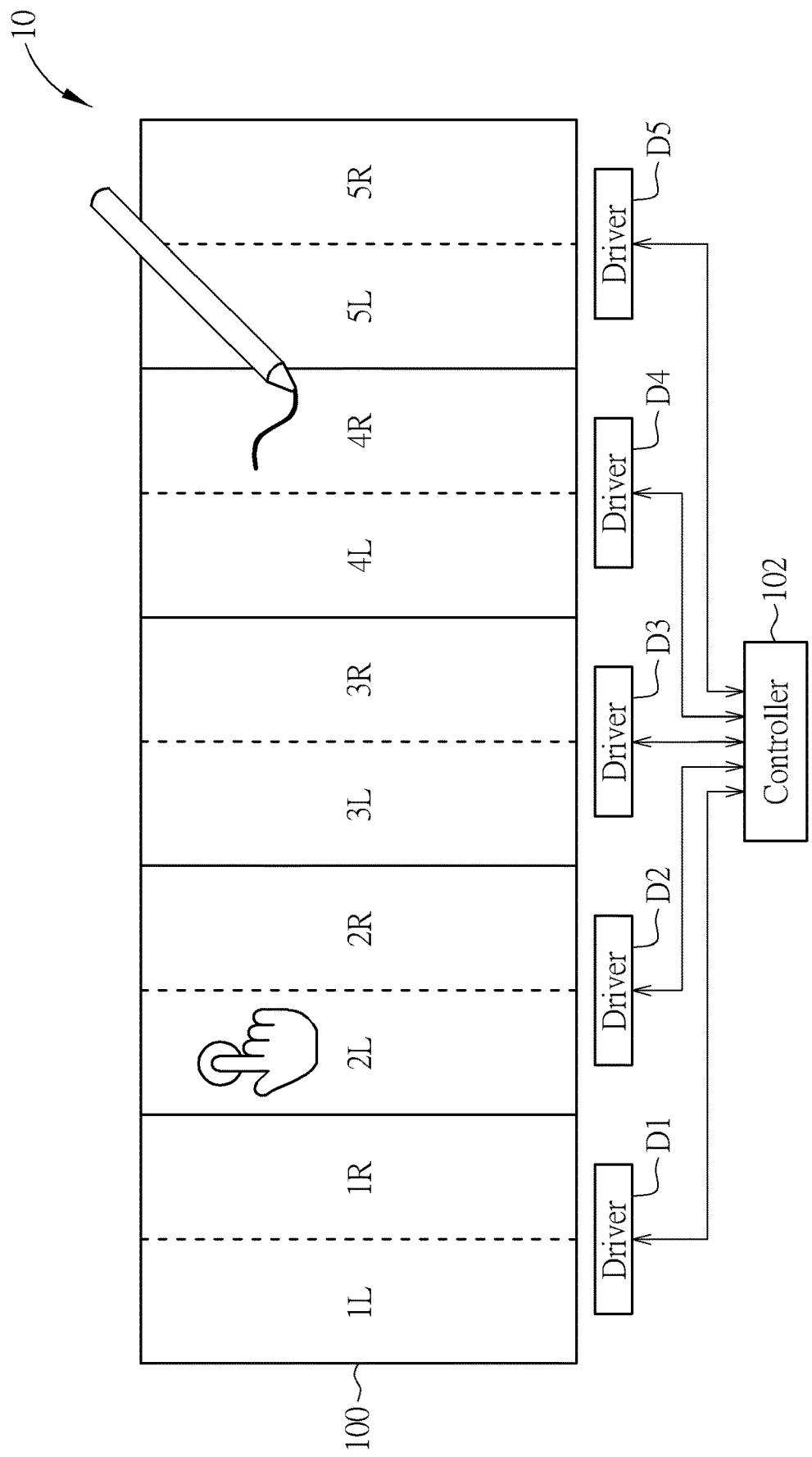
FIG. 10 is a schematic diagram of the touch panel on which a finger touch and a stylus are detected simultaneously.

In some embodiments, a finger touch and a stylus may be detected on the touch panel 100 simultaneously. Please refer to FIG. 10, which is a schematic diagram of the touch panel 100 on which a finger touch and a stylus are detected simultaneously. As shown in FIG. 10, the finger touch is detected on the area 2L and the stylus is detected on the area 4R. The touch detection scheme may be implemented in any feasible manners based on the touch behaviors of the finger and the stylus.

Figure 11:
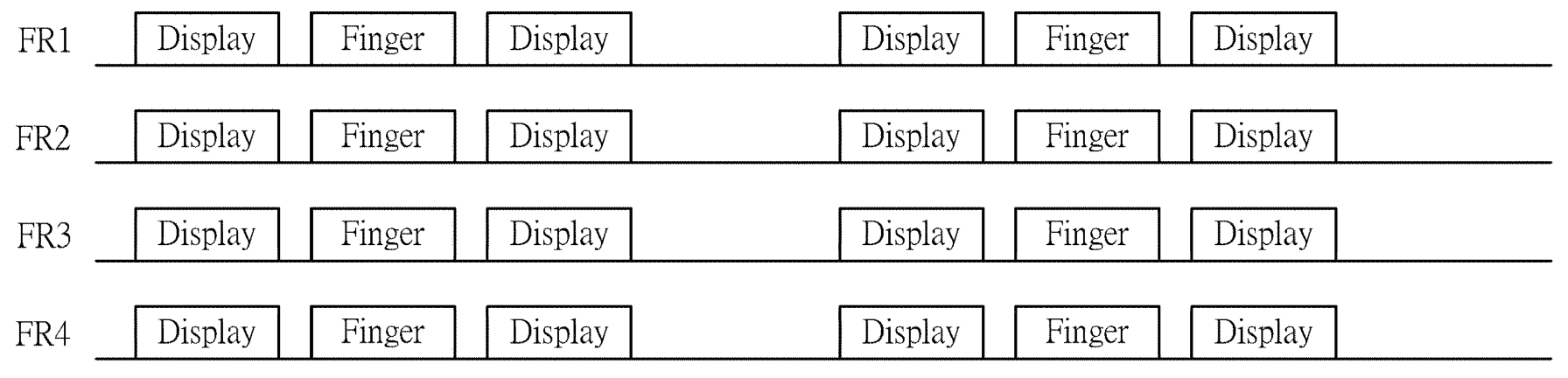

In an embodiment, when the finger touch is detected on the area 2L and the stylus is detected on the area 4R, the area 2L may apply the touch detection scheme with higher finger detection rate and lower stylus detection rate as shown in FIG. 6, and the area 4R may apply the touch detection scheme with lower finger detection rate and higher stylus detection rate as shown in FIG. 8. If the touch panel 100 and its related driving system 10 support only one stylus, the area 2L may be configured to apply the touch detection scheme with higher finger detection rate and no stylus detection as shown in FIG. 11. Other areas such as 1L, 1R, 2R, 3L, 3R, 4L, 5L and 5R may apply the touch detection scheme with lower finger detection rate and lower stylus detection rate as shown in FIG. 4 if multiple styluses are supported in the touch panel 100, and alternatively, the lower stylus detection rate on these areas may be replaced by no stylus detection if only one stylus is supported in the touch panel 100.

In an embodiment, considering that the touch finger may quickly move to an adjacent area on the touch panel 100, the areas (e.g., 1R and 2R) adjacent to the area 2L where the finger touch is detected may apply the touch detection scheme with higher finger detection rate and lower stylus detection rate as shown in FIG. 6, or apply the touch detection scheme with higher finger detection rate and no stylus detection as shown in FIG. 11. Similarly, considering that the stylus may also quickly move to an adjacent area on the touch panel 100, the areas (e.g., 4L and 5L) adjacent to the area 4R where the stylus is detected may apply the touch detection scheme with lower finger detection rate and higher stylus detection rate as shown in FIG. 8.

According to the above descriptions, those skilled in the art should infer any possible arrangement and combination of high/low detection rate for finger touch detection and stylus detection. For example, if a finger touch and a stylus are simultaneously detected on the same area (i.e., the abovementioned first area and second area are identical), both the finger touch detection and stylus detection may be performed with high detection rate on this area or also the adjacent area(s).

Since the finger touch may be detected on only one or few areas of the touch panel 100, the finger touch detection function of most drivers may be switched to lower detection rate and thereby disabled in several frames. Similarly, since the stylus may be detected on only one or few areas of the touch panel 100, the stylus detection function of most drivers may be switched to lower detection rate and thereby disabled in several frames. As a result, a considerable power reduction may be achieved in the driving system of a touch panel, especially the driving system of a large-scale touch panel with the usage of a great number of drivers.

Please note that the embodiments of the present invention aim at providing a method of controlling stylus and finger touch detection in order to achieve power saving. Those skilled in the art may make modifications and alternations accordingly. For example, in the above embodiments, each driver D1-D5 is configured to control a left area and a right area, and the two areas may be controlled using different touch detection schemes independently. In another embodiment, a driver may be configured to control more than two areas independently. Alternatively, each driver such as each source driver IC may be regarded as a unit to be independently configured with a touch detection scheme. Power consumption may be reduced if any one of the drivers may apply a touch detection mode with lower detection rate to disable the touch detection function in several frame times.

In addition, in the above embodiments, the higher detection rate means that touch detection (such as finger touch detection or stylus detection) is performed in the allocated time slots of all frame times, and the lower detection rate means that touch detection (such as finger touch detection or stylus detection) is performed in the allocated time slots of only one of four consecutive frame times. Note that the implementation of the present invention is not limited thereto. For example, in an embodiment, two consecutive frame times may be grouped together and the lower detection rate may be configured as performing touch detection in one of the two consecutive frame times and omitting touch detection in another one. As for the implementation of lower detection rate, the touch detection may be omitted in (N−1) frame times of every N frame times, where N may be any positive integer greater than 2.

Please also note that the embodiments of the present invention are applicable to the situations where the touch panel and its related driving system support only one of the finger touch detection or stylus detection. For example, if a touch panel is capable of capacitive touch sensing without the stylus function, the time slots may be allocated to "Display" and "Finger" alternately. In such a situation, the finger touch detection in each area may apply the higher detection rate or lower detection rate based on the detection result of finger touch behavior. Similarly, if a touch panel is capable of stylus detection without the finger touch function, the time slots may be allocated to "Display" and "Stylus" alternately. In such a situation, the stylus detection in each area may apply the higher detection rate or lower detection rate or no stylus detection is performed based on the detection result of stylus touch behavior.

Further, the control method for touch detection of the present invention may be applied to any type of touch panel, such as a liquid crystal display (LCD) panel, organic light-emitting diode (OLED) panel, and plasma display panel (PDP). As for the LCD panel, the control method for touch detection may be applied to the in-cell, on-cell or out-cell structure. As long as the panel is equipped with touch sensing function such as finger touch sensing or stylus sensing, and the touch sensing function may be disabled in several frame times to achieve power reduction, the operations should belong to the scope of the present invention.

Figure 12:
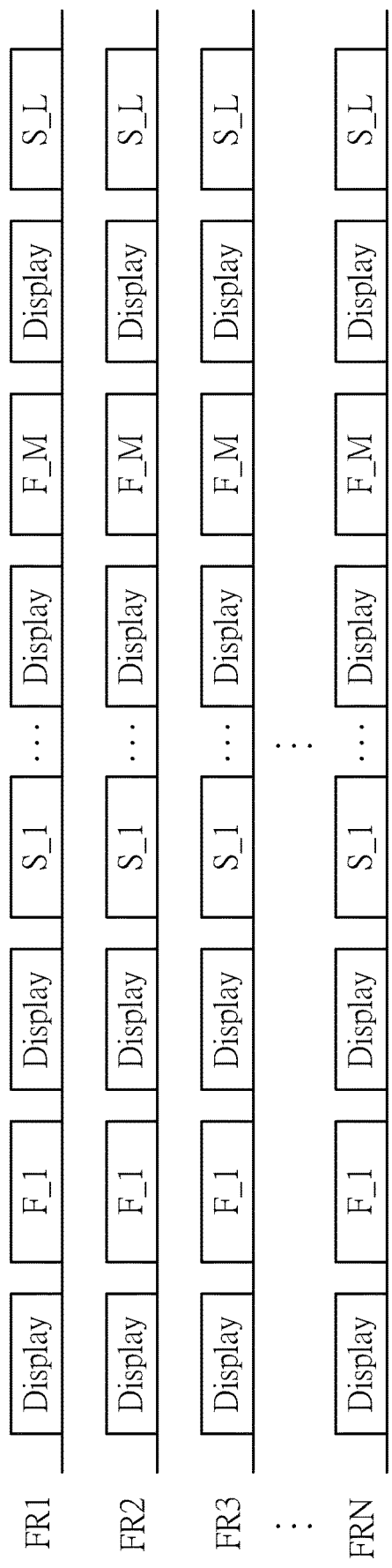
FIG. 12 is a schematic diagram of another touch detection scheme according to an embodiment of the present invention.

Please refer to FIG. 12, which is a schematic diagram of another touch detection scheme according to an embodiment of the present invention. As shown in FIG. 12, there are N frame times FR1-FRN, where each frame time includes M time slots F_1-F_M allocated to finger touch detection and L time slots S_1-S_L allocated to stylus detection, where N, M and L are any possible positive integers, and M and L may be equal or unequal. In this embodiment, the finger touch detection in each of the M time slots F_1-F_M and the stylus detection in each of the L time slots S_1-S_L in each frame time FR1-FRN may be controlled independently. For example, as for an area of the touch panel, the finger touch detection function may be enabled in several of the time slots F_1-F_M of a frame time, and disabled in other time slots of the frame time; also, the stylus detection function may be enabled in several of the time slots S_1-S_L of a frame time, and disabled in other time slots of the frame time. In this manner, the finger touch detection and stylus detection may have more levels of detection rates. This achieves a more flexible control for touch detection, so as to achieve the optimal balance between power consumption and touch sensitivity.

To sum up, the present invention may provide a method of controlling stylus and finger touch detection. In an embodiment, the method is applicable to a driving system of a touch panel having a plurality of drivers, and the touch panel is separated into a plurality of areas each controlled by one of the drivers. Therefore, each area of the touch panel may be controlled independently, or each driver may be controlled independently, to perform the touch detection in a higher detection rate or lower detection rate. If there is no finger touch and stylus detected on the touch panel, each area may apply the touch detection scheme where both the finger touch detection and stylus detection are performed with lower detection rate. If a finger touch is detected on a first area while no stylus is detected, the first area (or also its adjacent area(s)) may apply the touch detection scheme with higher finger detection rate and lower stylus detection rate, while other areas may stay in the detection mode with lower detection rate. If a stylus is detected on a second area while no finger touch is detected, the second area (or also its adjacent area(s)) may apply the touch detection scheme with lower finger detection rate and higher stylus detection rate, while other areas may stay in the detection mode with lower detection rate. In an embodiment, if the touch panel and its related driving system support only one stylus, the areas farther from the second area (where the stylus is detected) may not need to perform stylus detection. In the implementation of lower detection rate, the touch detection operation may be omitted in some or all time slots of several frame times. The higher detection rate is performed in an area only when finger touch or stylus is detected on this area or the adjacent area(s). Therefore, the power consumption for touch detection may be reduced by decreasing the operation rates of finger touch detection and stylus detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a controller, for controlling a plurality of drivers, each of the plurality of drivers coupled to a panel having a plurality of areas, and configured to control at least one of the plurality of areas of the panel, the method comprising:
controlling each of the plurality of drivers to perform finger touch detection in a first finger detection mode and perform stylus detection in a first stylus detection mode;
in response to a finger touch detected on a first area among the plurality of areas, controlling the first area to enter a second finger detection mode from the first finger detection mode for receiving finger touch detection; and
in response to a stylus detected on a second area among the plurality of areas, controlling the second area to enter a second stylus detection mode from the first stylus detection mode for receiving stylus detection.

2. The method of claim 1, further comprising:
when the finger touch is detected on the first area, controlling a first driver corresponding to the first area to perform finger touch detection in the first finger detection mode on the corresponding area among the plurality of areas other than the first area.

3. The method of claim 2, further comprising:
when the finger touch is detected on the first area, controlling the plurality of drivers except for the first driver to perform finger touch detection in the first finger detection mode on the corresponding area among the plurality of areas.

4. The method of claim 1, further comprising:
when the stylus is detected on the second area, controlling a second driver corresponding to the second area to perform stylus detection in the first stylus detection mode on the corresponding area among the plurality of areas other than the second area.

5. The method of claim 4, further comprising:
when the stylus is detected on the second area, controlling the plurality of drivers except for the second driver to perform stylus detection in the first stylus detection mode on the corresponding area among the plurality of areas.

6. The method of claim 1, further comprising:
when the finger touch is detected on the first area, controlling at least one of a first driver corresponding to the first area and a third driver corresponding to at least one third area adjacent to the first area to perform finger touch detection in the second finger detection mode on the at least one third area.

7. The method of claim 1, further comprising:
when the stylus is detected on the second area, controlling at least one of a second driver corresponding to the second area and a fourth driver corresponding to at least one fourth area adjacent to the second area to perform stylus detection in the second stylus detection mode on the at least one fourth area.

8. The method of claim 1, wherein a first driver corresponding to the first area performs finger touch detection with a first detection rate in the first finger detection mode and performs finger touch detection with a second detection rate in the second finger detection mode, wherein the second detection rate is higher than the first detection rate.

9. The method of claim 1, wherein a second driver corresponding to the second area performs stylus detection with a first detection rate in the first stylus detection mode and performs stylus detection with a second detection rate in the second stylus detection mode, wherein the second detection rate is higher than the first detection rate.

10. The method of claim 1, further comprising:
when the stylus is detected on the second area, controlling each of the plurality of areas except for the second area and except for at least one area adjacent to the second area to receive no stylus detection from any of the plurality of drivers.

11. A controller, coupled to a plurality of drivers, each of the plurality of drivers coupled to a panel having a plurality of areas, and configured to control at least one of the plurality of areas of the panel, the controller being configured to:
control each of the plurality of drivers to perform finger touch detection in a first finger detection mode and perform stylus detection in a first stylus detection mode;
in response to a finger touch detected on a first area among the plurality of areas, control the first area to enter a second finger detection mode from the first finger detection mode for receiving finger touch detection; and
in response to a stylus detected on a second area among the plurality of areas, control the second area to enter a second stylus detection mode from the first stylus detection mode for receiving stylus detection.

12. The controller of claim 11, further being configured to:
when the finger touch is detected on the first area, control a first driver corresponding to the first area to perform finger touch detection in the first finger detection mode on the corresponding area among the plurality of areas other than the first area.

13. The controller of claim 12, further being configured to:
when the finger touch is detected on the first area, control the plurality of drivers except for the first driver to perform finger touch detection in the first finger detection mode on the corresponding area among the plurality of areas.

14. The controller of claim 11, further being configured to:
when the stylus is detected on the second area, control a second driver corresponding to the second area to perform stylus detection in the first stylus detection mode on the corresponding area among the plurality of areas other than the second area.

15. The controller of claim 14, further being configured to:
when the stylus is detected on the second area, control the plurality of drivers except for the second driver to perform stylus detection in the first stylus detection mode on the corresponding area among the plurality of areas.

16. The controller of claim 11, further being configured to:
when the finger touch is detected on the first area, control at least one of a first driver corresponding to the first area and a third driver corresponding to at least one third area adjacent to the first area to perform finger touch detection in the second finger detection mode on the at least one third area.

17. The controller of claim 11, further being configured to:
when the stylus is detected on the second area, control at least one of a second driver corresponding to the second area and a fourth driver corresponding to at least one fourth area adjacent to the second area to perform stylus detection in the second stylus detection mode on the at least one fourth area.

18. The controller of claim 11, wherein a first driver corresponding to the first area performs finger touch detection with a first detection rate in the first finger detection mode and performs finger touch detection with a second detection rate in the second finger detection mode, wherein the second detection rate is higher than the first detection rate.

19. The controller of claim 11, wherein a second driver corresponding to the second area performs stylus detection with a first detection rate in the first stylus detection mode and performs stylus detection with a second detection rate in the second stylus detection mode, wherein the second detection rate is higher than the first detection rate.

20. The controller of claim 11, further being configured to:
when the stylus is detected on the second area, control each of the plurality of areas except for the second area and except for at least one area adjacent to the second area to receive no stylus detection from any of the plurality of drivers.

* * * * *